United States Patent
Feiertag et al.

(10) Patent No.: US 10,992,715 B2
(45) Date of Patent: Apr. 27, 2021

(54) SYSTEM AND METHOD FOR APPLICATION SOFTWARE SECURITY AND AUDITING

(71) Applicant: Rapid7, Inc., Boston, MA (US)

(72) Inventors: Michael Feiertag, San Francisco, CA (US); Garrett Held, San Francisco, CA (US); Andre Eriksson, San Francisco, CA (US); William Saar, San Francisco, CA (US)

(73) Assignee: Rapid7, Inc., Boston, MA (US)

( * ) Notice: Subject to any disclaimer, the term of this patent is extended or adjusted under 35 U.S.C. 154(b) by 83 days.

(21) Appl. No.: 16/445,431

(22) Filed: Jun. 19, 2019

(65) Prior Publication Data
US 2019/0306198 A1 Oct. 3, 2019

Related U.S. Application Data

(63) Continuation of application No. 15/480,229, filed on Apr. 5, 2017, now Pat. No. 10,594,733.

(51) Int. Cl.
H04L 29/06 (2006.01)
G06F 8/61 (2018.01)
G06F 21/57 (2013.01)
G06F 21/62 (2013.01)

(52) U.S. Cl.
CPC ............... H04L 63/20 (2013.01); G06F 8/61 (2013.01); G06F 21/577 (2013.01); G06F 21/6245 (2013.01); H04L 63/1425 (2013.01); G06F 2221/033 (2013.01)

(58) Field of Classification Search
CPC ...... G06F 21/577; G06F 21/55; G06F 21/566; G06F 21/554; G06F 11/302; G06F 11/3072; G06F 2221/033
See application file for complete search history.

(56) References Cited

U.S. PATENT DOCUMENTS

| 7,958,558 | B1* | 6/2011 | Leake | G06F 21/552 726/23 |
| 8,646,088 | B2* | 2/2014 | Pistoia | H04L 63/1441 726/25 |
| 9,400,889 | B2* | 7/2016 | Chess | G06F 21/563 |
| 9,473,523 | B1* | 10/2016 | Hay | G06F 21/577 |
| 2006/0026682 | A1* | 2/2006 | Zakas | H04L 63/0263 726/22 |
| 2006/0195745 | A1* | 8/2006 | Keromytis | G06F 21/554 714/741 |
| 2007/0118534 | A1* | 5/2007 | Hayes | G06F 21/6227 |
| 2007/0136312 | A1* | 6/2007 | Shulman | G06F 16/972 |

(Continued)

Primary Examiner — Tae K Kim
(74) Attorney, Agent, or Firm — Ashwin Anand

(57) ABSTRACT

A system and method for application software security and auditing are disclosed. A particular embodiment includes an application security management system configured to: instrument one or more data input and output points of an application for one or more instances of data identified as sensitive data, access one or more policies corresponding to the one or more instances of the sensitive data, trace the one or more instances of the sensitive data through the application in association with the one or more policies, and generate an audit of each instance of the sensitive data indicating a route from which the sensitive data is accessed, to where the sensitive data is written, and where the sensitive data surfaces in the application.

12 Claims, 13 Drawing Sheets

(56) References Cited

U.S. PATENT DOCUMENTS

| | | | |
|---|---|---|---|
| 2011/0231936 A1* | 9/2011 | Williams | G06F 21/577 |
| | | | 726/25 |
| 2014/0165204 A1* | 6/2014 | Williams | H04L 63/02 |
| | | | 726/25 |
| 2014/0194094 A1* | 7/2014 | Ahuja | H04W 4/021 |
| | | | 455/410 |
| 2015/0082439 A1* | 3/2015 | Molnar | G06F 21/566 |
| | | | 726/23 |
| 2015/0309813 A1* | 10/2015 | Patel | G06F 11/3664 |
| | | | 703/22 |
| 2015/0332043 A1* | 11/2015 | Russello | G06F 21/52 |
| | | | 726/23 |
| 2016/0359896 A1* | 12/2016 | Hay | G06F 21/54 |
| 2017/0034023 A1* | 2/2017 | Nickolov | H04L 43/0817 |
| 2018/0091306 A1* | 3/2018 | Antonopoulos | G06F 21/57 |

* cited by examiner

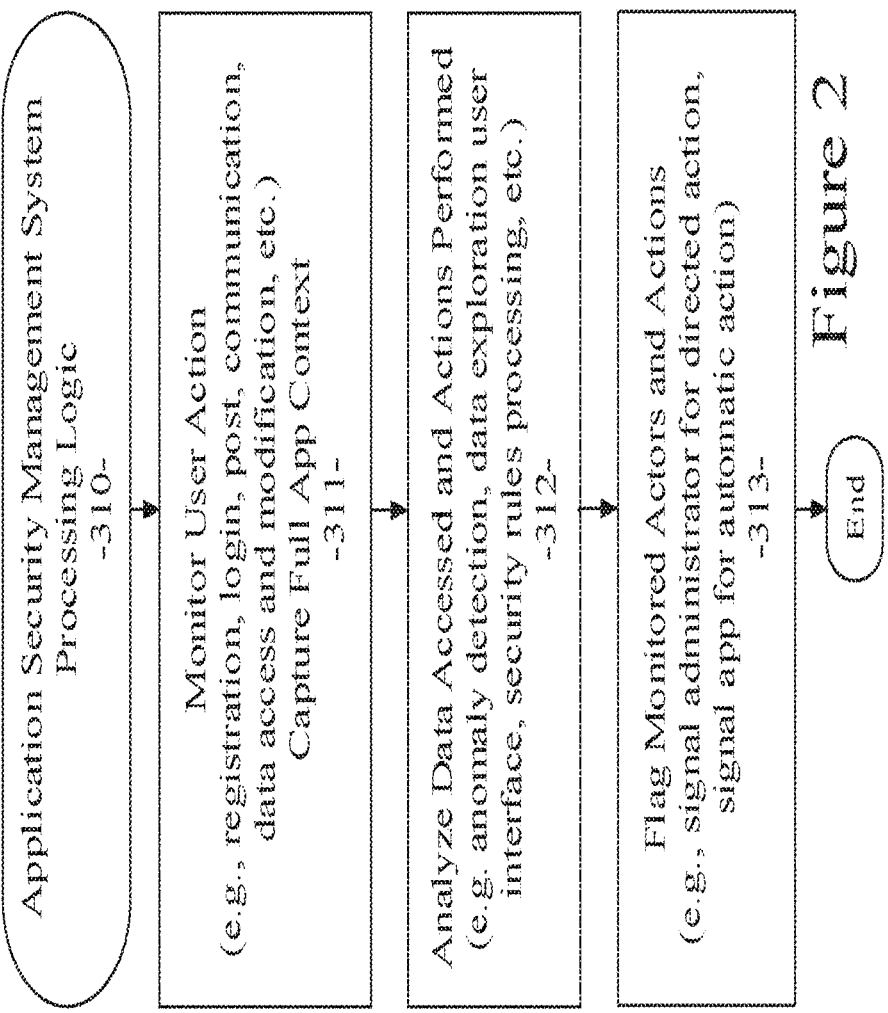

```
┌─────────────────────────────┐
│ Application Security         │
│ Management System            │
│ User Model Processing Logic  │
│           -320-              │
└──────────────┬──────────────┘
               │
               ▼
┌─────────────────────────────────────────────┐
│ Activate Security Management Function.       │
│ If a data sampling mode is enabled, collect  │
│ a few examples of queries and responses.     │
│ These can be used to find sensitive data     │
│ when the column names are not clear.         │
│                   -321-                      │
└──────────────┬──────────────────────────────┘
               │
               ▼
┌─────────────────────────────────────────────┐
│ Present Protectible Data for Selection.      │
│ Show an audit of tables and columns          │
│ accessible with routes (e.g., tables,        │
│ columns, and routes). Show sample rows       │
│ for each, if enabled.                        │
│                   -322-                      │
└──────────────┬──────────────────────────────┘
               │
               ▼
┌─────────────────────────────────────────────┐
│ Enable User to Select Sensitive Data for     │
│ Tracing. Allow user to pick the data to      │
│ trace by marking columns or tables as        │
│ sensitive.                                   │
│                   -323-                      │
└──────────────┬──────────────────────────────┘
               │
               ▼
┌─────────────────────────────────────────────┐
│ Enable User to Define Rules or Policies for  │
│ the Selected Sensitive Data.                 │
│ User-selected sensitive tables, columns,     │
│ and routes can be handled based on a         │
│ user-defined policy (e.g., output on         │
│ selected routes to selected logs, pages,     │
│ APIs, interfaces, queues, etc.)              │
│                   -324-                      │
└──────────────┬──────────────────────────────┘
               │
               ▼
┌─────────────────────────────────────────────┐
│ Record User Sensitive Data Tracing           │
│ Selections and Policy Definitions.           │
│ Record user-selected sensitive tables,       │
│ columns, and routes, and associated          │
│ policies.                                    │
│                   -325-                      │
└──────────────┬──────────────────────────────┘
               │
               ▼
            ( End )
```

Figure 3

```
┌─────────────────────────────────────┐
│ Application Security Management     │
│ System Operational Model            │
│ Processing Logic                    │
│              -330-                  │
└──────────────┬──────────────────────┘
               ▼
┌─────────────────────────────────────┐
│ Instrument Application Data Input   │
│ and Output Points.                  │
│              -331-                  │
└──────────────┬──────────────────────┘
               ▼
┌─────────────────────────────────────┐
│ Monitor Instrumented Application    │
│ Data Input and Output Points for    │
│ Instances of Data Identified by     │
│ the User as Sensitive Data.         │
│              -332-                  │
└──────────────┬──────────────────────┘
               ▼
┌─────────────────────────────────────┐
│ Obtain Policies Corresponding to    │
│ the Detected Instances of           │
│ Sensitive Data.                     │
│              -333-                  │
└──────────────┬──────────────────────┘
               ▼
┌─────────────────────────────────────┐
│ Trace and Control the Detected      │
│ Instances of Sensitive Data Through │
│ the Application According to the    │
│ Corresponding Policies.             │
│              -334-                  │
└──────────────┬──────────────────────┘
               ▼
┌─────────────────────────────────────┐
│ Generate an Audit of All Instances  │
│ of Sensitive Data Input and Output  │
│ Detected and Controlled in the      │
│ Application.                        │
│ Generate an audit showing, for      │
│ example: 1) from which routes the   │
│ sensitive data is accessed; 2) to   │
│ where is the sensitive data         │
│ written, and 3) where the sensitive │
│ data surfaces (e.g., show route     │
│ leading to a log, page, API         │
│ output, interface, etc.).           │
│              -335-                  │
└──────────────┬──────────────────────┘
               ▼
            ( End )
```

SYSTEM AND METHOD FOR APPLICATION SOFTWARE SECURITY AND AUDITING

PRIORITY PATENT APPLICATION

This application is a non-provisional U.S. patent application drawing priority from non-provisional U.S. patent application Ser. No. 15/480,229; filed Apr. 5, 2017, which further draws priority from U.S. provisional patent application No. 62/319,194; filed Apr. 6, 2016. The entire disclosures of the referenced patent applications are considered part of the disclosure of the present application and are hereby incorporated by reference herein in their entirety.

TECHNICAL FIELD

This patent application relates to application software, application software security, computer-implemented software, and networked systems, according to one embodiment, and more specifically to a system and method for application software security and auditing.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015-2017 tCell.io, Inc., and 2018-2019 Rapid7, Inc., All Rights Reserved.

BACKGROUND

The accessibility and convenience of the Internet (including the web) has rapidly changed the way people access and consume information. Individuals, enterprises, organizations, and governments expose their personal and business information and functionality on the web through software applications, usually referred to as "web applications," "web apps," or "apps." Web applications typically use Internet technologies, protocols, and infrastructures between stationary or mobile computing/communication platforms or nodes. Other networks can be similarly used. A typical web application can use backend file systems, databases, and logging systems to access, process, and store application data for client users. The backend file systems, databases, and logging systems can be accessed by the web application through a variety of conventional operating system calls, database protocols, such as Structured Query Language (SQL) commands, and various network protocols. Additionally, typical web applications can use 3rd party services accessed via application programming interfaces (APIs) or web interfaces and the network.

Web applications provide a high degree of utility and efficiency for an individual or an organization. However, these applications can also be vulnerable to attack from malicious parties using malware or subject to the errant coding of programmers. Malware may include, but is not limited to, spyware, rootkits, password stealers, spam, sources of phishing attacks, sources of denial-of-service-attacks, viruses, loggers, trojans, adware, or any other digital content that produces malicious activity. In some instances, malware may attempt to hijack sensitive information by intercepting or "sniffing" content of an input/output (I/O) operation. I/O operations may include transmissions of data between an application executing on an electronic device and file systems, databases, or peripheral devices of the electronic device (e.g., display devices, keyboards, disk drives, etc.). By attempting to intercept such content, malware may obtain usernames, passwords, financial data, or other sensitive information.

Additionally, it is important and sometimes legally required to audit and verify the security, accuracy, and compliancy of web app processing with appropriate standards. The mere absence of malware is not enough to validate the processing performed by the application. In many cases, large and complex applications are involved in on-going development, enhancement, expansion, updates, and bug fixes. It is important to validate that changes to the application have not caused new problems or deviations from desired functionality.

The increasing reliance on software applications combined with rapidly increasing complexity of these applications can create significant business risk stemming from the use of non-validated software applications. The most efficient way to reduce this risk is to detect and eliminate software application vulnerabilities as early as possible. However, existing systems have been unable to provide application security and auditing functions at low levels of granularity with high levels of configurability and efficiency. Therefore, there exists a need for better systems and methods of performing vulnerability detection in software applications and services.

BRIEF DESCRIPTION OF THE DRAWINGS

The various embodiments are illustrated by way of example, and not by way of limitation, in the figures of the accompanying drawings in which:

FIGS. 2 through 5 are flow diagrams illustrating the data processing performed by an example embodiment of the application security management system;

FIGS. 7 through 10 illustrate example user interface snapshots, implemented as a web application, that show the basic elements of the user interface of the application security management system in an example embodiment;

DETAILED DESCRIPTION

Figure 1:
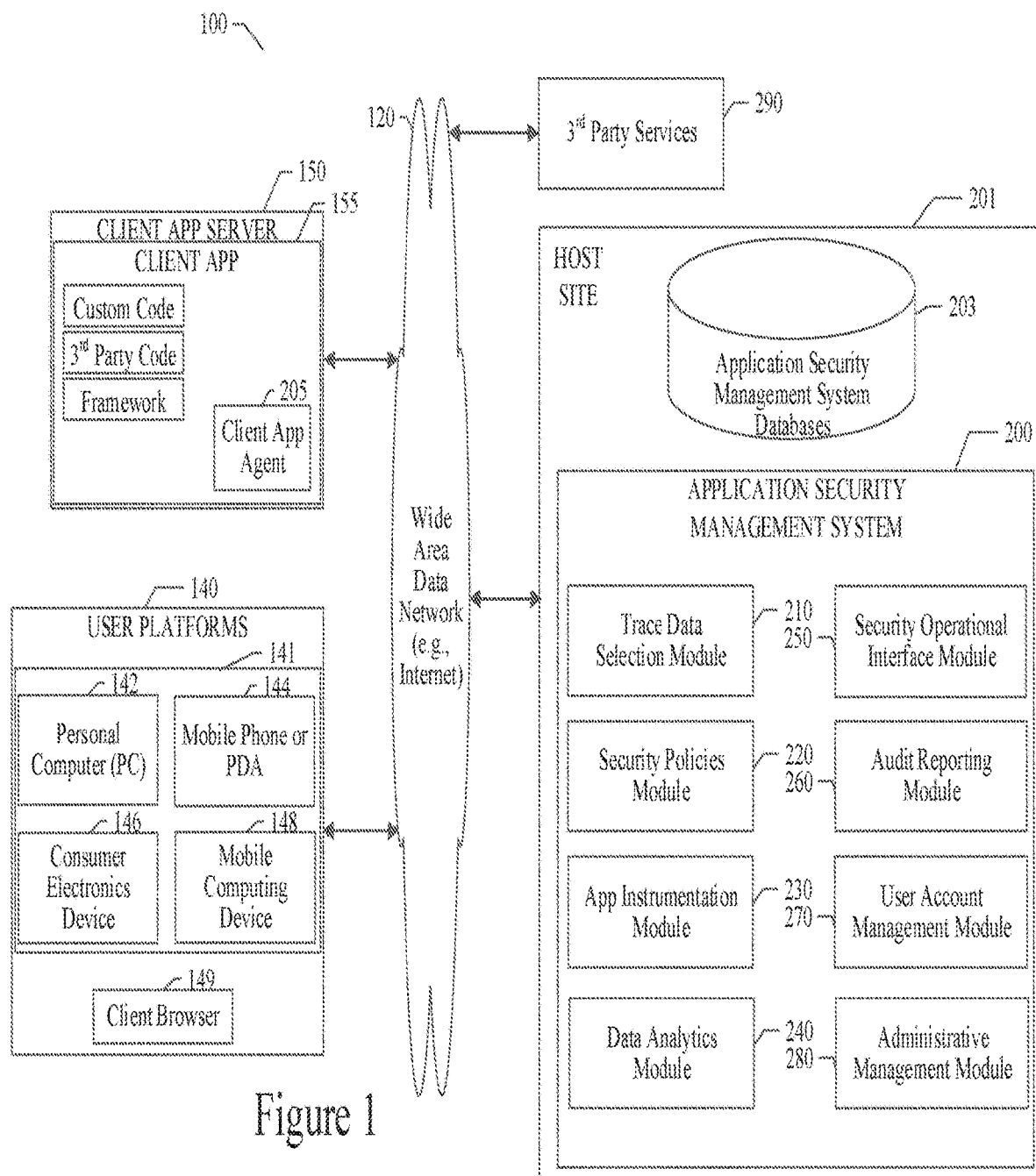
FIG. 1 illustrates an example embodiment of an application security management system in a network-enabled ecosystem.

In the following description, for purposes of explanation, numerous specific details are set forth in order to provide a thorough understanding of the various embodiments. It will be evident, however, to one of ordinary skill in the art that the various embodiments may be practiced without these specific details. The various example embodiments described herein can be applied to corresponding systems, apparatus, computer readable media, and computer program products.

Overview of an Example Embodiment

In the various embodiments described herein, a system and method for application software security and auditing are disclosed. The various embodiments provide the ability to audit and apply security controls to the data that software applications (apps) access and use. Additionally, the various embodiments described herein provide a system and method for application software security and auditing that can detect the presence of vulnerabilities in a software application. A software application, web app, mobile app, or other app can include all forms of software code executing on computer hardware, including any virtualization hardware technology. An application can be a web application or server running on a web or application server, a mobile application running on a mobile device, a client or server application running on a desktop computer, or any other form of software, including embedded systems in a vehicle, appliance, airplane, weapon system, robot, or the like. For example, an application might read a medical record and present the data to a doctor, or take a password from the user and validate the password against a database. In the first case, the medical record data should be presented on specific, controlled screens to the end user and should never go in a log that can be accessed by technical administrators and engineers. In the second case, the password data shouldn't be presented anywhere. While software engineers attempt to design their apps in such a way that the data is managed correctly, security engineers generally do not have direct visibility into whether this software design is actually done correctly and are not able to enforce policies without changing the software. The various embodiments described herein provide data controls to address this security challenge by giving security engineers the ability to discover and control the use of private data in a running application without modifying the software.

An example embodiment described herein provides and uses two major architectural components: 1) a client software application agent (client app agent) that instruments and monitors a client's running application (client app), and 2) a network cloud back end or host site where a service of the example embodiment runs analytics and policy management. To use an example embodiment, the customer/client user can download the client app agent and add the client app agent to the application server environment. Typically, this is done by copying or downloading a set of files or data objects associated with the client app agent to a directory and changing an application environment variable. Once this is done and the client software application (client app) is restarted or otherwise activated, the client app agent adds itself to the client app and instruments any part of the client app that the example embodiment needs to perform its security and auditing functions. The instrumentation of the client app gives the example embodiment the ability to collect detailed trace data on the processing and data flows performed as part of the functioning of the application. This detailed trace data can be forwarded by the client app agent to the host site service for analysis, and to effect specific policies within the client app that correspond to the detailed trace data.

In various embodiments described in detail below, a client app agent is installed in a client application running on a computer or computing system. The client application is instrumented with I/O instruments at data input and output points of the client application. The I/O instruments are used to gather, process, and distribute detailed trace data and other application data. As such, example embodiments described herein relate to an application software security and audit management system for gathering, processing, and distribution of detailed trace data and other data related to real-time operation of a client software application. The various embodiments described herein can be used with or on a computer, a computer system, a web appliance, a mobile device, embedded systems, or the like. As described in more detail below, the computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

Detail of an Example Embodiment

Referring now to FIG. 1, in an example embodiment, a system 100 for application software security management in a network-enabled ecosystem is disclosed. As commonly provided in traditional network-enabled ecosystems, customers, clients, or other users at user platforms 140 can be in networked data communication with one or more client application servers 150 on which one or more client software applications (client apps) 155 can be accessed and used by the client user at user platform 140 via a conventional wide area data network 120 (e.g., the Internet). Additionally, typical client software applications can use 3rd party services 290 accessed via application programming interfaces (APIs) or web interfaces and the network 120. For example, these $3^{rd}$ party services can include Microsoft® Azure™, Twilio™, Stripe™, Amazon® Web Services, and the like. In various example embodiments described herein, a back end or host service, typically provided by or operating on a host site (e.g., a website) 201, is embodied in an application security management system 200 of an example embodiment. In an example embodiment, the application security management system 200 can provide security and audit functions from the host site 201 in support of the client app 155 in use by a user at a user platform 140. Typically, the application security management system 200 can be hosted by the host site 201 to provide back end security and audit services for a networked user at a user platform 140. To assist in the support of the client app 155 and the operation of the application security management system 200, a software app agent or client app agent 205 can be downloaded from the host site 201 (or elsewhere) and added or installed into the client application server 150 environment. Typically, this is done by enabling a user at a user platform 140 to copy or download a set of files or data objects associated with the client app agent 205 into the client app 155 environment. Once the client app agent 205 is resident in the client app 155 environment, the client app agent 205 can add or install itself into the client app 155 and instrument any part of the client app 155 with embedded I/O instrumentation components or I/O instruments. As a result of these actions, the application security management system 200 can be in networked data communication with the client app agent 205 and the I/O instrumentation components embedded into the client app 155. The details of the installation and use of the application security management system 200 components of an example embodiment are provided below.

Referring again to FIG. 1, the client app 155 and the application security management system 200 can be in network communication with a plurality of user platforms 140. The client app server 150, the host site 201 and user platforms 140 may communicate and transfer data and information in the data network ecosystem 100 shown in FIG. 1 via a wide area data network (e.g., the Internet) 120. Network 120 is configured to couple one computing device with another computing device. Network 120 may be enabled to employ any form of computer readable media for communicating information from one electronic device to another. Network 120 can include the Internet in addition to other wide area networks (WANs), direct connections, such as through an Ethernet port or a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 120 may also include an autonomous system of terminals, gateways, routers, and the like connected by wireless radio links or wireless transceivers. These connectors may be configured to move freely and randomly and organize themselves arbitrarily, such that the topology of network 120 may change rapidly and arbitrarily.

Network 120 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, network 120 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 120 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, network 120 may include virtually any wired and/or wireless communication mechanisms by which information may travel between one computing device and another computing device, network, and the like.

The application security management system 200 and client app agent 205 can be implemented using any form of programming language, executable code, software syntax, machine code, interpreted code, markup language, and/or network transportable digital data and instructions. The network transportable digital data can be transported in any of a group of file formats, protocols, and associated mechanisms to enable a host site 201, a user platform 140, and a client app server 150 to transfer data and/or instructions over a network 120. In one embodiment, the data format for a data and/or user interface can be HyperText Markup Language (HTML). HTML is a common markup language for creating web pages and other information that can be displayed in a web browser. In another embodiment, the data format for the user interface can be Extensible Markup Language (XML). XML is a markup language that defines a set of rules for encoding interfaces or documents in a format that is both human-readable and machine-readable. In another embodiment, a JSON (JavaScript Object Notation) format can be used to stream content to the various user platform 140 devices. JSON is a text-based open standard designed for human-readable data interchange. The JSON format is often used for serializing and transmitting structured data over a network connection. JSON can be used in an embodiment to transmit data between a server, device, or application, wherein JSON can serve as an alternative to XML. The Hypertext Transfer Protocol (HTTP) or secure HTTP (HTTPS) can be used as a network data communication protocol. It will be apparent to those of ordinary skill in the art that other well-known protocols, data formats, and coding formats can be similarly used.

In a particular embodiment, a user platform 140 with one or more client devices 141 enables a user to access data and provide data and/or instructions for the client app 155 via the client app server 150 and the application security management system 200 via the host 201 and network 120. Client devices 141 may include virtually any computing device that is configured to send and receive information over a network, such as network 120. Such client devices 141 may include portable or mobile devices 144, such as, cellular telephones, smartphones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or mobile computing devices 148, which are known to those of ordinary skill in the art. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and many lines of color LCD display in which both text and graphics may be displayed. Moreover, the web-enabled client device may include a browser application 149 enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with mobile applications (mobile apps) with which the functionality described herein can be implemented.

Client devices 141 may also include at least one client application that is configured to send and receive content data or/and control data from another computing device via a wired or wireless network transmission. The client application may include a capability to provide and receive textual data, graphical data, video data, audio data, and the like. Moreover, client devices 141 may be further configured to communicate and/or receive a message, such as through an email application, a Short Message Service (SMS), direct messaging (e.g., Twitter™), Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

As one option, the application security management system 200, or a portion thereof, can be downloaded to a user device 141 of user platform 140 and executed locally on a user device 141. The downloading of the application security management system 200 application (or a portion thereof) can be accomplished using conventional software downloading functionality. As a second option, the application security management system 200 can be hosted by the host site 201 and executed remotely, from the user's perspective, on host system 201. In one embodiment, the application security management system 200 can be implemented as a service in a service-oriented architecture (SOA) or in a Software-as-a-Service (SAAS) architecture. In any case, the functionality performed by the application security management system 200 is as described herein, whether the application is executed locally or remotely, relative to the user.

Referring again to FIG. 1, the host site 201 and application security management system 200 of an example embodiment are shown to include an application security management system database 203. The database 203 can be used in an example embodiment for data storage of information related to client applications, client users, client app agents, client app policies, traced data element selections, trace data, analytics data, audit data, security data and the like. It will be apparent to those of ordinary skill in the art that the database 203 can represent multiple datasets and can be used for the storage of a variety of data in support of the application security management system 200 of an example embodiment. The databases described herein can be implemented using well-known data storage applications or systems, such as Microsoft® Access™, Oracle™, Excel™, SQL, spreadsheets, tables, flat files, relational database files, or any other type of structured data storage.

Referring again to FIG. 1, host site 201 of an example embodiment is shown to include application security management system 200. Application security management system 200 can include a trace data selection module 210, a security policies module 220, an app instrumentation module 230, a data analytics module 240, a security operational interface module 250, an audit reporting module 260, a user account management module 270, and an administrative management module 280. Each of these modules can be implemented as software components executing within an executable environment of application security management system 200 operating on host site 201 or user platform 140. Additionally, as shown in FIG. 1, the client app agent 205 of an example embodiment can be configured to execute within an executable environment of client app server 150. Each of these modules of an example embodiment is described in more detail below in connection with the figures provided herein.

Referring again to FIG. 1, the application security management system 200 of an example embodiment can include the client app agent 205. As described above, the client app agent 205 of an example embodiment can be configured to execute within an executable environment of client app server 150. The client app agent 205 is configured to interface with a plurality of I/O instruments embedded at particular points within the client app 155 that are associated with input and output operations. The instrumentation of the client app 155 is described in more detail below. In an example embodiment, the client app agent 205 can be a downloaded or otherwise installed as an executable that runs in the client app 155 environment. The client app agent 205 can also be a pre-installed executable, a dynamically installed plug-in, a mobile application (mobile app), or a dynamically linked element that runs in the client app 155 environment. Once the client app agent 205 is up and running in the client app 155 environment, the client app agent 205 can monitor the operation of the client app 155 and dynamically gather trace data associated with particular user-specified data elements of the client app 155 being monitored and for which user-specified policies can be configured. The trace data, or information indicative thereof, can be transferred from the client app agent 205 to the application security management system 200 to enable the application security management system 200 to locate and obtain one or more user-configured policies associated with the data elements of the client app 155 that correspond to the trace data. The obtained policies can be used to monitor or modify the operation of the client app 155 to conform to the associated policies. As a result, the application security management system 200 can monitor the operation of the client app 155 and impose user-defined policies upon the real-time operation of the client app 155.

Referring now to FIGS. 2 through 5, flow diagrams illustrate the data processing performed by an example embodiment of the application security management system 200. FIG. 2 illustrates an overview of the processing performed by the example embodiment. In processing block 311, the application security management system 200 in combination with the client app agent 205 can monitor user action in the client app 155. Such actions can include registration, login, post, communication, application data access and modification, and the like. In this manner, the application security management system 200 in combination with the client app agent 205 can capture the full context of the client app 155 running on the client app server 150. In processing block 312, the application security management system 200 in combination with the client app agent 205 can analyze data accessed and actions performed in the client app 155. The application security management system 200 can perform anomaly detection, trace previously user-selected client app 155 data elements and data actions, identify access to and manipulation of the previously identified sensitive data, and the like. In processing block 313, the application security management system 200 can flag monitored actors and actions. The application security management system 200 can signal a system administrator for directed action in response to a flagged event, signal the client app 155 for automatic action, and otherwise impose security rules corresponding to specific data processing in the client app 155.

FIG. 3 illustrates a flow diagram of the data processing performed by an example embodiment of the application security management system 200 in combination with the client app agent 205 to prompt and receive user selections of traced data elements and related policies or rules. In the example embodiment as shown in FIG. 1, the trace data selection module 210 can be responsible for generating and managing the user interface to receive user selections of traced data (e.g., data elements in or used with the client app 155 that are sensitive and should be specially handled according to a specific policy). In the example embodiment as also shown in FIG. 1, the security policies module 220 can be responsible for enabling a user to define and configure policies and rules to manage the traced data elements identified as sensitive. In processing block 321 of FIG. 3, the trace data selection module 210 can generate the user interface to prompt the user to identify the sensitive traced data elements and to receive user selections of traced data elements and related policies from the user. In an example embodiment, if a data sampling mode is enabled, the trace data selection module 210 can collect a few examples of queries and responses. These queries and responses can be used to find sensitive data when the column names are not clear. In processing block 322, the trace data selection module 210 can present protectable data to the user for selection as sensitive traced data elements. In the example embodiment, the trace data selection module 210 can present any type of data object or data path for user selection as a traced data element, including entire databases or file systems, file directories, software libraries, file or dataset groupings, individual files or data objects, file portions, individual tables, specific rows or columns within tables, databases, or spreadsheets, individual data fields or data items within a file, table, database, spreadsheet, web pages, textual data elements, image or graphical data elements, audio or video elements, data paths, routes, Uniform Resource Locators (URLs), and/or any other individual or collective data element that can be represented and identified. For example, the trace data selection module 210 can present to a user a listing or an audit of tables and columns accessible with routes (e.g., tables, columns, and routes). The trace data selection module 210 can show sample rows or sample items for each selectable data element, if the feature is enabled. In processing block 323, the trace data selection module 210 can enable the user, via the user interface, to select sensitive data elements for tracing. The trace data selection module 210 can allow the user to select or identify the data elements to trace by marking columns or tables, or otherwise identifying particular data elements as sensitive data for tracing. In processing block 324, the security policies module 220 can enable the user to define rules or policies corresponding to the selected sensitive data elements. For example, user-selected sensitive tables, columns, and routes can be handled based on a user-defined policy (e.g., output on selected routes to selected logs, pages, APIs, interfaces, queues, etc.) In processing block 325, the trace data selection module 210 and the security policies module 220 can record the sensitive data tracing selections and policy definitions. The trace data selection module 210 and the security policies module 220 can record the user-selected sensitive tables, columns, and routes, (and other sensitive traced data elements) and associated policies in database 203 or in other data storage resources.

FIG. 4 illustrates a flow diagram of the data processing performed by an example embodiment of the application security management system 200 in combination with the client app agent 205 for managing the operational processing and real-time data tracing as a client/user interacts with the client app 155. In processing block 331, the application security management system 200 can instrument client app 155 data input and output points. In the example embodiment as shown in FIG. 1, the app instrumentation module 230 can be responsible for managing the instrumentation process. The instrumentation process in an example embodiment is described in detail below in connection with FIGS. 5 and 6. In processing block 332 of FIG. 4, the application security management system 200 can monitor instrumented application data input and output points for instances of data elements previously identified by the user as sensitive data. In the example embodiment as shown in FIG. 1, the data analytics module 240 can be responsible for monitoring instrumented application data input and output points for instances of sensitive data elements. In processing block 333, the data analytics module 240 can obtain policies corresponding to the detected instances of sensitive data from the security policies module 220. The policies or rules can represent specific conditions and operations or actions to be performed by the client app 155, the application security management system 200, or other processing nodes in response to the detection of the specific conditions defined by the policy, such as a particular data element being accessed or modified by the client app 155. For example, a policy in an example embodiment can be defined as a set of rules represented in the following form:

Conditions/Actions:
    Routes (optional)
    Data source (database/column, API/field, etc.)
    Output rules
        Log rule: Allowed/not allowed+action
        User output rule: Allowed/not allowed+action
        One rule for each possible output of the application
        Actions can take the form of react, signal an error/exception, warn an administrator, or take other action In an example embodiment, these user-defined policies and related conditions and actions can include, for example, counts, alerts, redaction, encryption policies, and/or the like. For example, a count policy can be defined and user-configured to cause the application security management system 200 to maintain a counter associated with a particular traced data element, such as a file, a database record, a column or row in a database or spreadsheet, an data input field, or the like. The counter can be incremented each time user action with the client app 155 reads, modifies, or otherwise accesses the associated traced data element.

In another policy example, an alert policy can be defined and user-configured to cause the application security management system 200 to send an alert, message, or data communication to a designated recipient when the application security management system 200 detects that a corresponding traced data element has been read, modified, or otherwise accessed during use of the client app 155 by a user.

In another policy example, a redaction policy can be defined and user-configured to cause the application security management system 200 to redact, delete, replace, obscure, or otherwise render a particular traced data element unreadable, unusable, or inaccessible when the application security management system 200 detects that the particular traced data element has been read, modified, or otherwise accessed during use of the client app 155 by a user.

In another policy example, an encryption policy can be defined and user-configured to cause the application security management system 200 to encrypt a particular traced data element to render the particular data element unreadable, unusable, or inaccessible without a decryption key when the application security management system 200 detects that the particular traced data element has been read, modified, or otherwise accessed during use of the client app 155 by a user. It will be apparent to those of ordinary skill in the art in view of the disclosure herein that a variety of different policies can be defined and employed by the example embodiments described herein. In example embodiments, the policies can be defined by a user as part of the user processing model described above in connection with FIG. 3.

Referring still to FIG. 4 at processing block 334, the data analytics module 240 can trace and control the detected instances of sensitive data through the application and apply the corresponding policies. The client app agent 205 and the I/O instrumentation components embedded in the client app 155 can be used to detect an access or use of the user-specified sensitive data elements. The user can define and associate particular policies with corresponding sensitive data elements. In processing block 335, the application security management system 200 can generate an audit of all (or a portion of the) instances of sensitive data input, output, access, and/or modification detected and controlled in the client application. In the example embodiment as shown in FIG. 1, the audit reporting module 260 can be responsible for generating the audit of the sensitive data elements. The audit reporting module 260 can also generate an audit of all (or a portion of the) instances of the use of particular policies or rules. The detection of the use of the sensitive data elements can be performed using the I/O instrumentation components and the client app agent 205 as described in more detail below. For example, the audit reporting module 260 can generate an audit showing, for example: 1) from which routes the sensitive data is accessed; 2) to where is the sensitive data written, and 3) where the sensitive data surfaces (e.g., show route leading to a log, page, API output, interface, etc.). In another example, the application security management system 200 can use one or more policies to implement a whitelist or blacklist to allow or reject access and/or use of particular sensitive data elements or routes.

Figure 5:
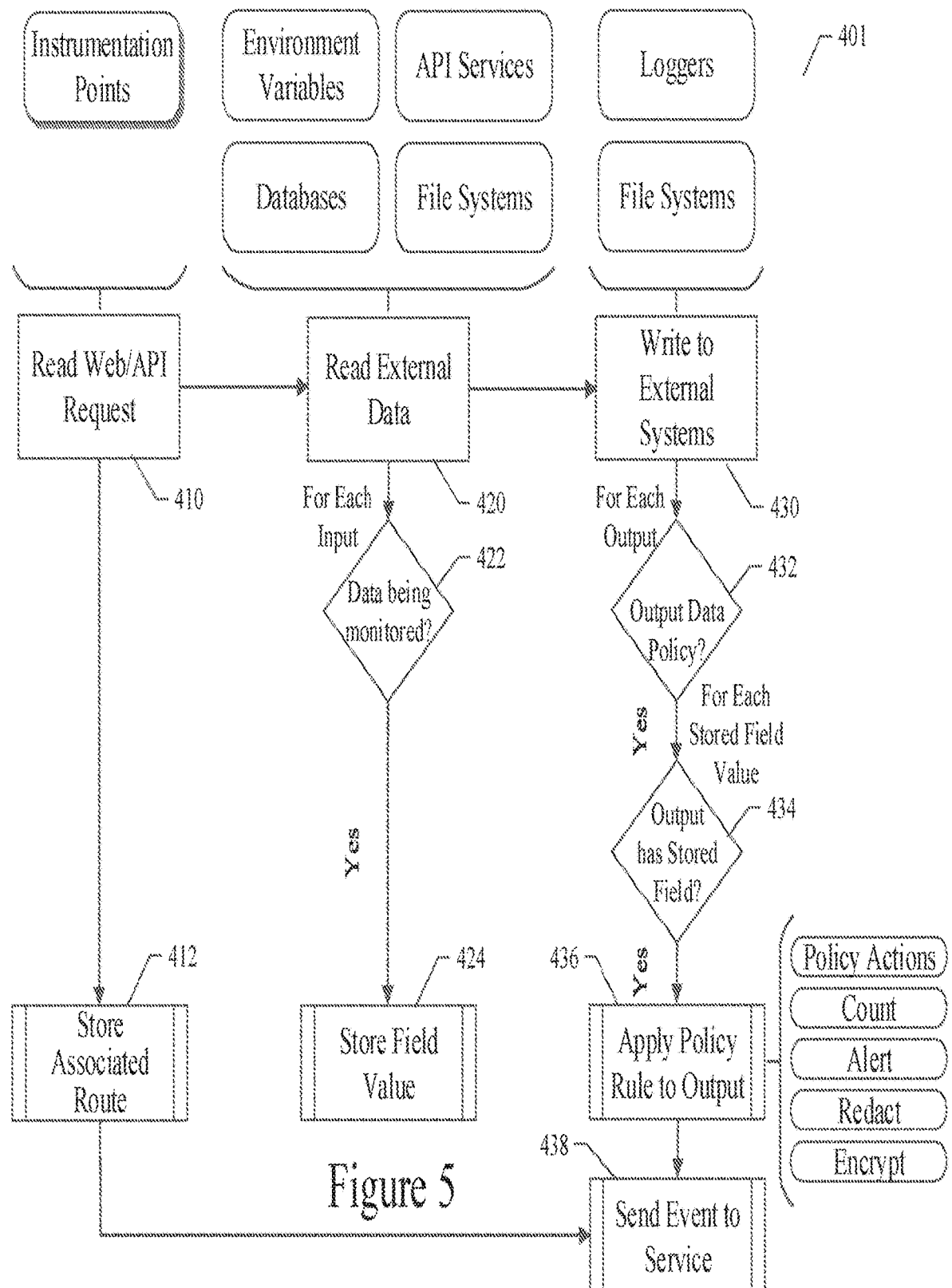
Figure 6:
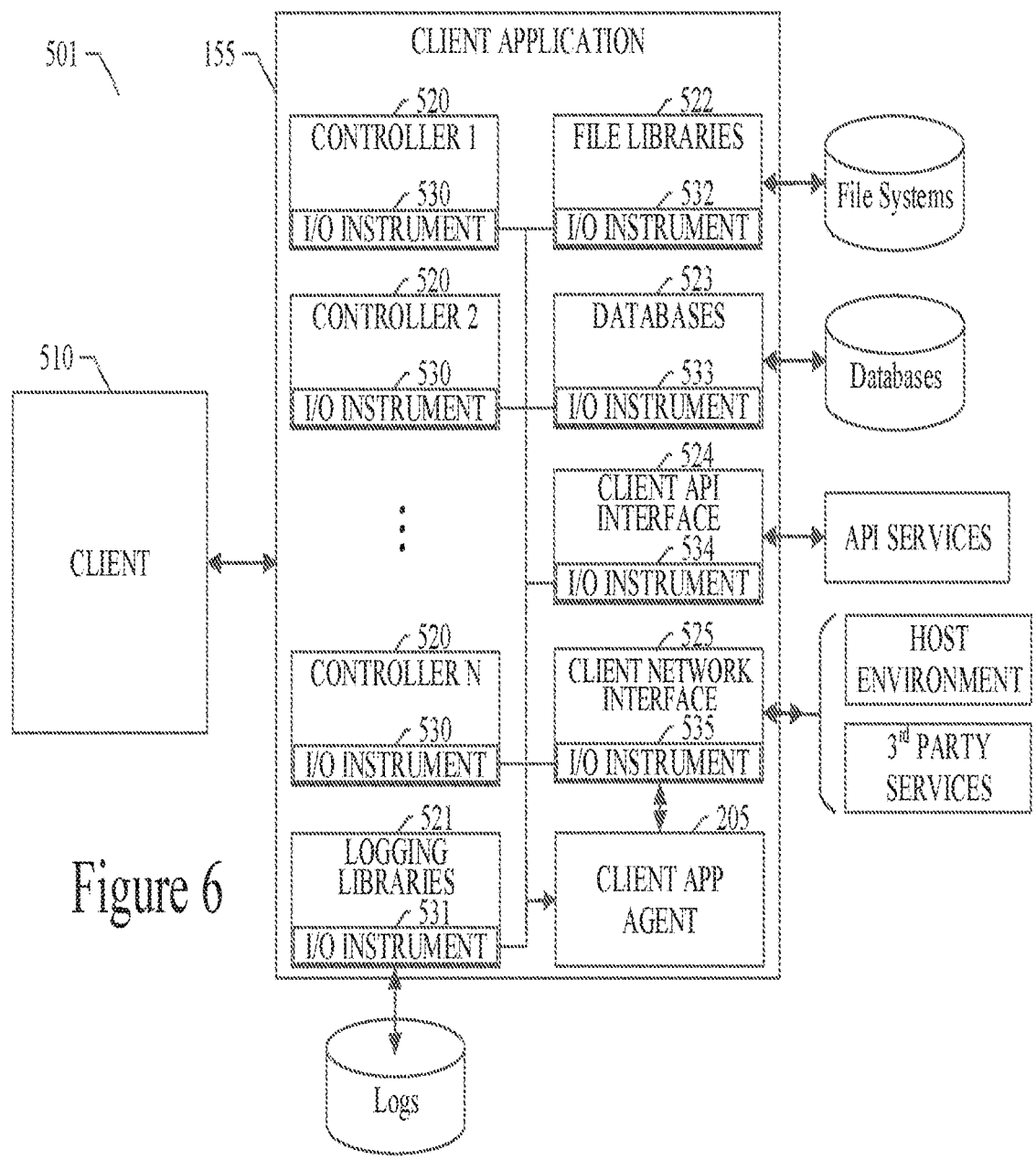
FIG. 6 illustrates the instrumentation of data input and output points in an application in an example embodiment.
Figure 7:
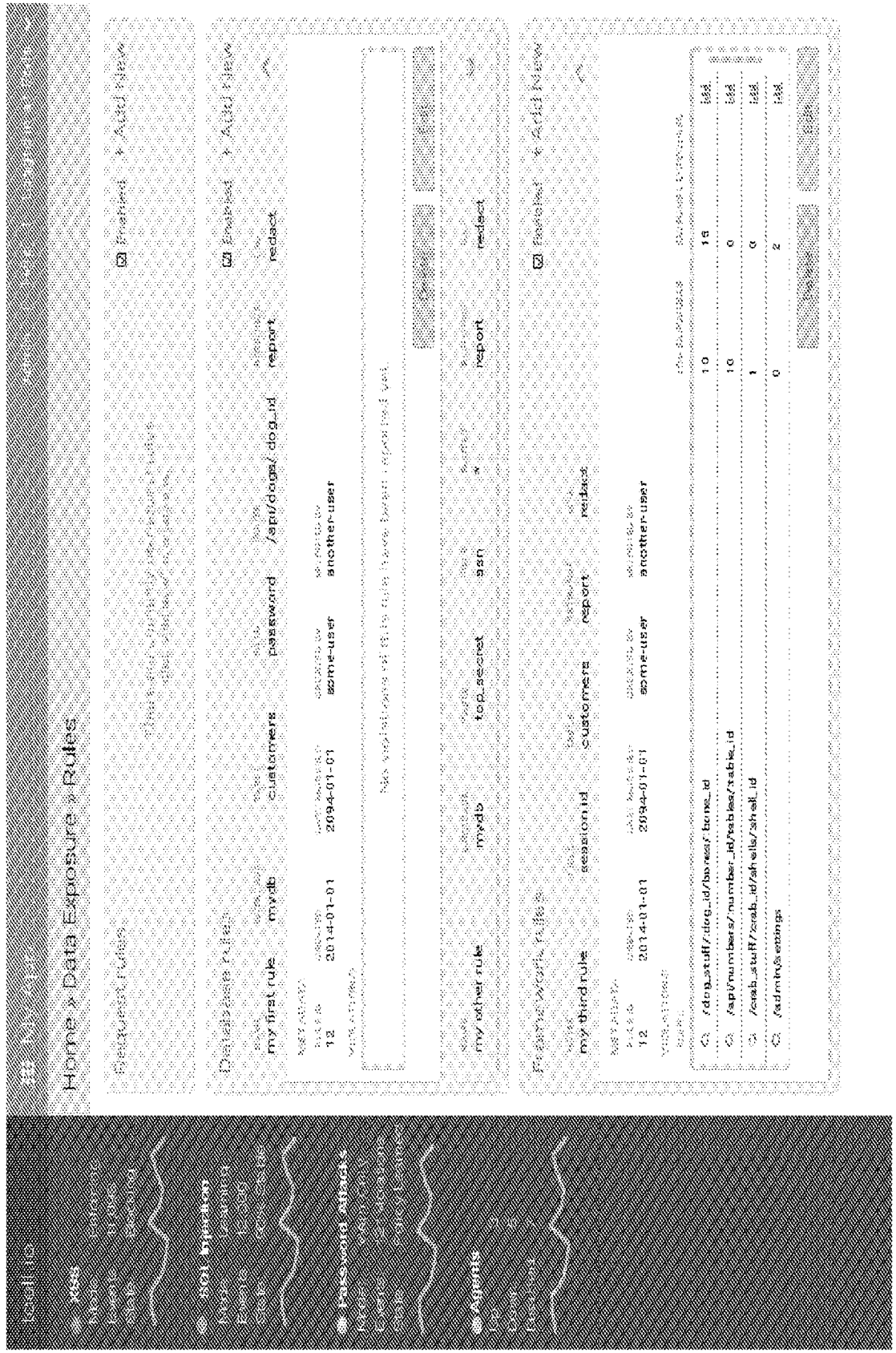
Figure 8:
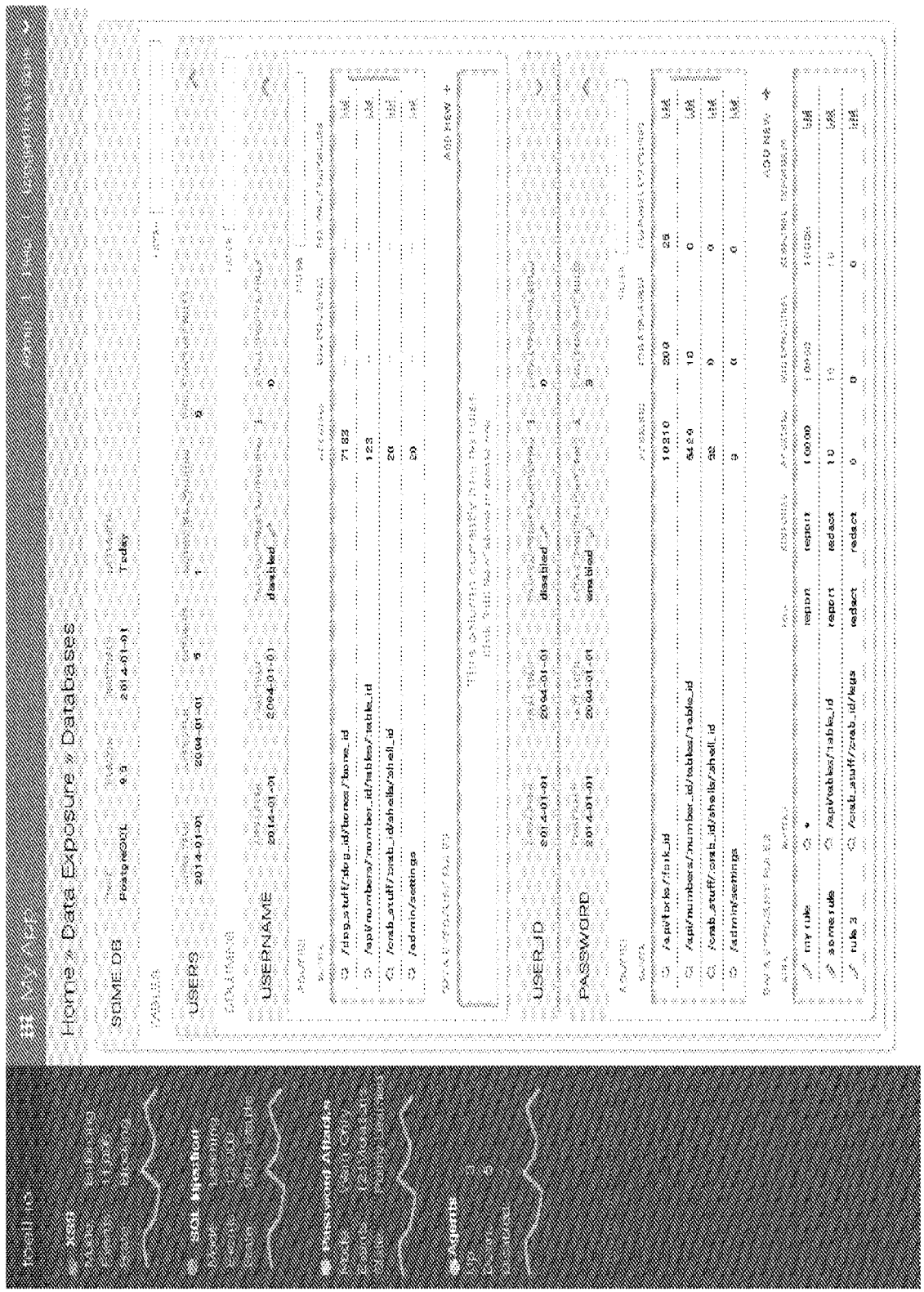
Figure 10:

FIG. 5 illustrates a flow diagram of the data processing performed by an example embodiment 401 of the application security management system 200 in combination with the client app agent 205 for managing the operational processing of the client app 155 for various types of I/O operations performed in the client app 155 at various instrumented I/O points. FIG. 6 illustrates the instrumentation of data input and output points in the client app 155 used by a client 510 in an example embodiment 501. In the example embodiment as shown in FIG. 1, the app instrumentation module 230 can be responsible for the instrumentation process. The instrumentation of the client app 155 enables the client app agent 205 to detect when particular data input and output points in the client app 155 are used. In an example embodiment, the key input and output points of the client app 155 are instrumented with a small code portion or I/O instrumentation component configured to detect an access at a particular I/O point and to transfer a message or signal of such an access detection to the client app agent 205. In the example embodiment, the key input and output points of the client app 155 that can be instrumented can include points in the client app 155 where the app performs I/O operations with data content or storage resources (e.g., file systems, databases, environment variables, data structures, APIs, logging or archiving resources, or the like). In a particular embodiment, the key input and output points of the client app 155 to be instrumented and corresponding actions to be taken can include the following:

Instrument the points in the client app 155 that trigger actions (e.g., the API end points and routes for context).

Instrument each client app 155 data input point, for example, file systems, databases, environment variables, data structures, API service points, user inputs, and the like.

Instrument each client app 155 data output point, for example, file systems, databases, environment variables, data structures, API service points, log outputs, and user outputs.

Instrument Controllers/routes (e.g., see I/O points 520 and I/O instruments 530 shown in FIG. 6)
  Identify the specific API end point/web page being used by the end user. For example, the "show user" page or "change password" API.
  Use this to specify the context for reporting and policy.

Instrument File System/Library Interfaces (e.g., see I/O point 522 and I/O instrument 532 shown in FIG. 6)
  Collect file system, directory, file name, file component name, and/or record name being accessed.
  Use this to track the data being read, modified, or otherwise accessed.
  If there is a policy specifying this data source, the value of the data source is stored locally in the client app agent 205 to be used when enforcing the policy.

Instrument Database controllers (e.g., see I/O point 523 and I/O instrument 533 shown in FIG. 6)
  Collect database name, table name, and column name being accessed.
  Use this to track the data being read, modified, or otherwise accessed.
  If there is a policy specifying this data source, the value of the data source is stored locally in the client app agent 205 to be used when enforcing the policy.

Instrument Representational State Transfer (REST) or Simple Object Access Protocol (SOAP) API libraries (e.g., see I/O point 524 and I/O instrument 534 shown in FIG. 6)
  Instrument libraries used to access third party services such as micro-services or cloud based API services.
  Collect the structure and field names of the responses to API calls. In the case of an XML, based API, this may be an XML schema or set of X-PATH entries. For a JSON-based API, this may be a JSON structure with field names and dummy values.
  This is also used to track from where data comes and to where the data goes.
  If there is a policy specifying this data source, the value of the data source is stored locally in the client app agent 205 to be used when enforcing the policy.

Instrument Logging libraries (e.g., see I/O point 521 and I/O instrument 531 as shown in FIG. 6)
  Instrument each place the application writes to logs.
  This is used to control to where the data goes.
  The contents of the log entry can be checked against the locally stored list of sensitive data. For example, the log string "debug: read ABCD1234 from the database" might be checked against the string "ABCD1234" associated with the password policy.
  If a match is found, the action is executed.

Instrument the points in the client app 155 that interact with networked 3$^{rd}$ party services via a network interface (e.g., see I/O point 525 and I/O instrument 535 shown in FIG. 6).

Instrument Output stream libraries
  Instrument the points where the application writes data to a client device interface.
    For example, this could be the servlet output stream in a typical Java Servlet based application.
    This is used to control to where the data goes.
    The contents of the stream is checked against the locally stored list of sensitive data.
    If a match is found, the action is executed.
  Instrument socket writes, database inserts, and queuing to a messaging service (including internal queues)

Referring still to FIG. 5, the app instrumentation module 230 and the client app agent 205 of an example embodiment can instrument the key input and output points of the client app 155 as described above. In a particular embodiment, the client app 155 can be instrumented when the client app agent 205 is installed into the client app 155. Thereafter, the user/client can use the client app 155 as normally done. When instrumented I/O operations in the client app 155 are executed and detected by an I/O instrument, the I/O instrument and the client app agent 205 can extract trace data identifying the detected I/O operation and the context of the client app 155 at the time of the detected operation. For example, the trace data can include the specific API end point/web page, the file system, directory, and file name, file component name, and/or record name being accessed, the database name, table name, and column name being accessed, the structure and field names of the responses to API calls, identifiers of logs to which data is written, and the like. The trace data can include other meta-data to identify or clarify the context of the client app 155. In general, the trace data can identify the specific data elements (e.g., database tables and columns, API end points, etc.) being accessed, read, or modified by the execution of the client app 155 within the context of the user action. The trace data can be compiled by the client app agent 205 and transferred to the application security management system 200 via the network 120.

For example, as shown in FIG. 5, an instrumented API/Web read request 410 can be detected by the client agent 205 in data communication with the corresponding I/O instrument. In response to this monitored event, the client app agent 205 can retain trace data including a route associated with the API/Web read request 410 (block 412). This trace data can be stored locally with the client app agent 205 and/or forwarded to the application security management system 200. The API/Web read request 410 can be forwarded to the appropriate service (block 438).

For another example, as shown in FIG. 5, an instrumented external data read operation 420 can be detected by the client agent 205 in data communication with the corresponding I/O instrument. In response to this monitored event, the client app agent 205 can determine if the particular data being read was previously identified by the user as sensitive data and thus monitored or traced data (decision block 422). If the data being read is sensitive data being monitored, the data value is stored as part of the trace data saved in block 424. This trace data can be stored locally with the client app agent 205 and/or forwarded to the application security management system 200.

For yet another example, as shown in FIG. 5, an instrumented external data write operation 430 can be detected by the client agent 205 in data communication with the corresponding I/O instrument. In response to this monitored event, the client app agent 205 can determine if the particular data being output was previously identified by the user as sensitive data and thus monitored or traced data (decision block 432). If the data being written is sensitive data being monitored, the client app agent 205 can further determine if the user previously established a policy for handling the particular sensitive data (decision block 432). If a policy for the particular sensitive data was defined by the user, the policy can be applied to the output data in block 436. Further, for each output stored field value (decision block 434), policies can be applied to the output stored field values in block 436. Additionally, if the data being written is sensitive data being monitored, the output data can be stored as part of the saved trace data. This trace data can be stored locally with the client app agent 205 and/or forwarded to the application security management system 200 (block 438). In this manner, specific data elements used in the context of particular user actions with a client app 155 can be traced and specific policies can be applied for handling the specific data elements.

In an example embodiment as shown in FIG. 5, these policies and related conditions and actions can include counts, alerts, redaction, encryption policies, and/or the like. These policies in an example embodiment are described above. It will be apparent to those of ordinary skill in the art in view of the disclosure herein that a variety of different policies can be defined and employed by the example embodiments described herein. As shown in FIG. 5, any of these policies or combinations of policies can be applied to the sensitive output stored field values in block 436.

Thus, as shown in FIGS. 5 and 6, example embodiments can receive user-defined and configured policies or rules and apply the appropriate policies for corresponding sensitive data elements being monitored in a client app 155. For each sensitive data element associated with a policy for which an access is detected within the context of a current client app 155 transaction, the associated policy can be applied in real-time while the client app 155 is being used. Additionally, the application security management system 200 can monitor all outputs used in a transaction for the sensitive data read earlier in processing the transaction. For example, if there is a policy rule that specifies that the 'password' column in the 'user' table should never be logged, then the value of the password field (for example) can be obtained and saved by the application security management system 200 as this data element is read by the client app 155. For example, the application security management system 200 can save the password string 'ABCD1234' (for example), and then monitor the use of the log within the processing of the same transaction for the string 'ABCD1234'. If a violation is discovered (e.g., subsequent usage of the same string is detected), the application security management system 200 can take the action configured in the corresponding policy. In a particular example of such a policy, the policy can be configured to cause the application security management system 200 to replace the instance of the detected password string with another string, e.g. '[XXXXXX]'. Additionally or alternatively, the policy can be configured to cause the application security management system 200 to trigger an exception to stop the transaction from proceeding, or just send a log event to the application security management system 200 for reporting or logging.

In another example of the application security management system 200 in an example embodiment, a policy can be defined to prevent (or explicitly allow) a client application 155 from accessing particular network sites, domains, URLs, or other data paths or routes. In other embodiments, the application security management system 200 and related policies can be configured to limit access to a particular data element by volume (e.g., the quantity of accesses in a given time period). For example, a policy can be defined and configured wherein a User/Session/Transaction (for example) can access a sensitive data element (e.g., a row in a table, database, spreadsheet, webpage, etc.), but not more than N times in a given time period. In other embodiments, the application security management system 200 and related policies can be configured to add inline, field level data element encryption. The application security management system 200 can thus be configured to automatically encrypt and decrypt data elements written to and read from a resource. As a result, the application security management system 200 can be configured to handle all of the messy key management issues.

Referring again to FIG. 1, the application security management system 200 of an example embodiment can include a security operational interface module 250 to generate a security operational interface. In the example embodiment, a security operational interface can be provided to enable an authorized host representative to view and manipulate a security operations console from which the host representative can manage the operation of the application security management system 200 in real time. The security operational interface can be used to manage the client app agent 205 on the client app server 150 and the installation of the I/O instrumentation components in the client app 155. The security operational interface can also be used to generate various informational display views to present system information in real time.

As described above, a user platform 141 can include a mobile device on which a mobile application (mobile app) can be executed. An example embodiment, implemented as a mobile device app, can be used to support a mobile device user interface for the application security management system 200 of an example embodiment. It will be apparent to those of ordinary skill in the art that other embodiments can also be implemented as a web application (web app) with one or more webpages or other types of user interfaces. A mobile version of an example embodiment provides a user-friendly interface from which the user can easily view relevant information from a mobile device. As described herein, a mobile software application (mobile app) embodying a mobile version of an example embodiment as described herein can be installed and executed on a mobile device, such as a smartphone, laptop computer, tablet device, or the like.

Referring again to FIG. 1, the application security management system 200 of an example embodiment is also shown to include a user account management module 270. The user account management module 270 can be used to create and maintain a user account on the host site 201. The user account management module 270 can also be used to configure user settings, create and maintain a user profile on host site 201, and otherwise manage user data and operational parameters on host site 201. In the example embodiment described herein, a user can register as an identified user in order to share information, documents, communications, or other content. The registered user can enter their appropriate user credentials. Once this information is entered, a user account is created and the user can share information, documents, communications, or other content.

Referring again to FIG. 1, the application security management system 200 of an example embodiment is shown to include an administrative management module 280. The administrative management module 280 can be used by an agent of the application security management system 200 to manage user accounts and to manage the application security management system. The administrative management module 280 can also be used to enforce privacy protections and content controls for users. Moreover, the administrative management module 280 can also be used to generate and/or process a variety of analytics associated with the operation of the application security management system 200. For example, the administrative management module 260 can generate various statistical models that represent the activity of the community of users and related client apps 155. These analytics can be shared, licensed, or sold to others.

FIGS. 7 through 10 illustrate example user interface snapshots, implemented as a web application, that show the basic elements of the user interface of the application security management system in an example embodiment. Although the various user interface displays provided by the example embodiments described herein are nearly infinitely varied, several sample user interface displays and sequences are provided herein and in the corresponding figures to describe various features of the disclosed embodiments. These sample user interface displays and sequences are described herein and in the accompanying figures. It will be apparent to those of ordinary skill in the art in view of the disclosure herein that equivalent user interface displays and sequences can be implemented within the scope of the inventive subject matter disclosed and claimed herein.

Figure 11:
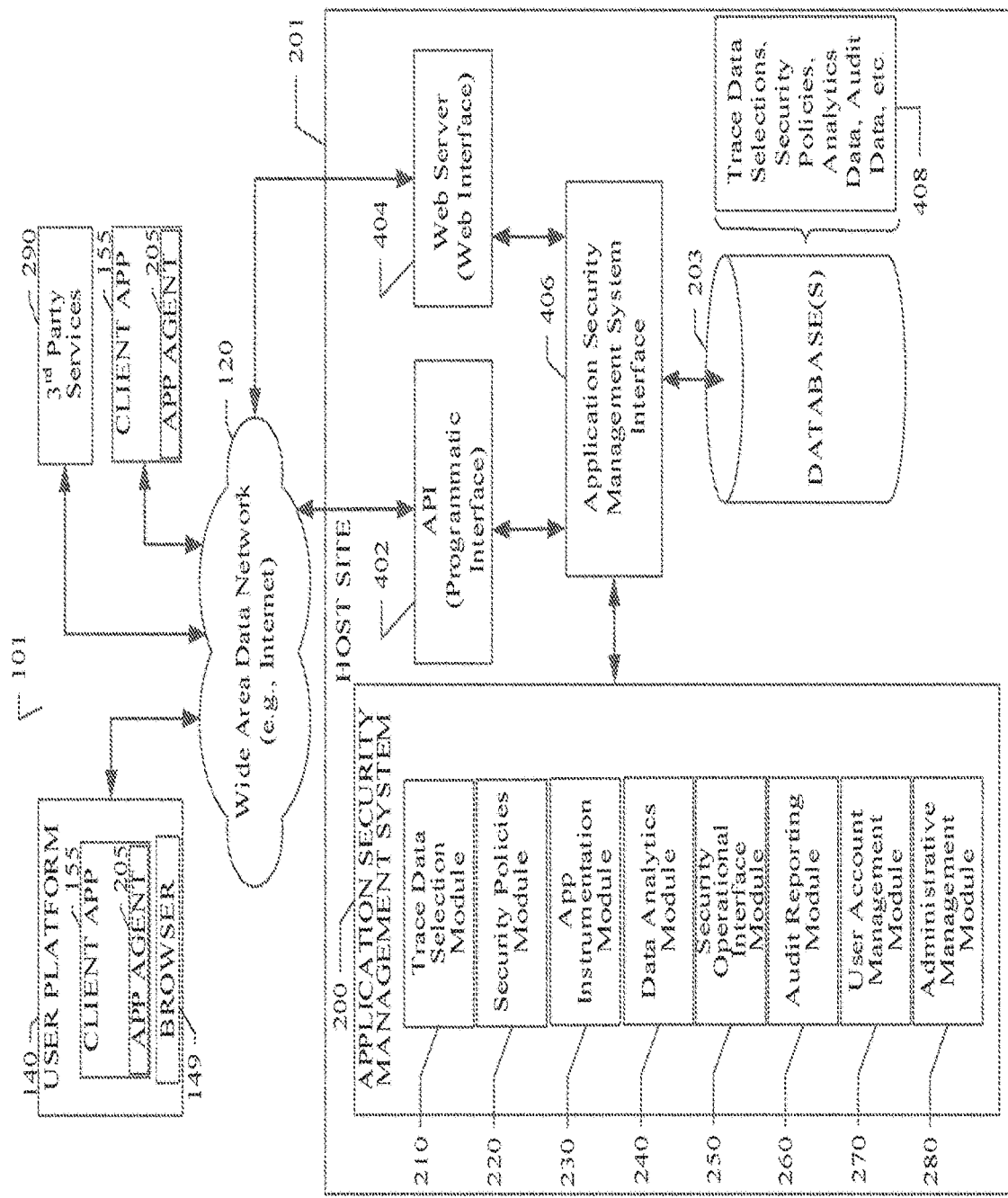
FIG. 11 illustrates another example embodiment of a networked system in which various embodiments may operate.

Referring now to FIG. 11, another example embodiment 101 of a networked system in which various embodiments may operate is illustrated. In the embodiment illustrated, the host site 201 is shown to include the application security management system 200. The application security management system 200 is shown to include the functional components 210 through 280, as described above. In a particular embodiment, the host site 201 may also include a web server 404, having a web interface with which users may interact with the host site 201 via a user interface or web interface. The host site 201 may also include an application programming interface (API) 402 with which the host site 201 may interact with other network entities on a programmatic or automated data transfer level. The API 402 and web interface 404 may be configured to interact with the application security management system 200 either directly or via an interface 406. The application security management system 200 may be configured to access a data storage device 103 and data 408 therein either directly or via the interface 406.

Figure 12:
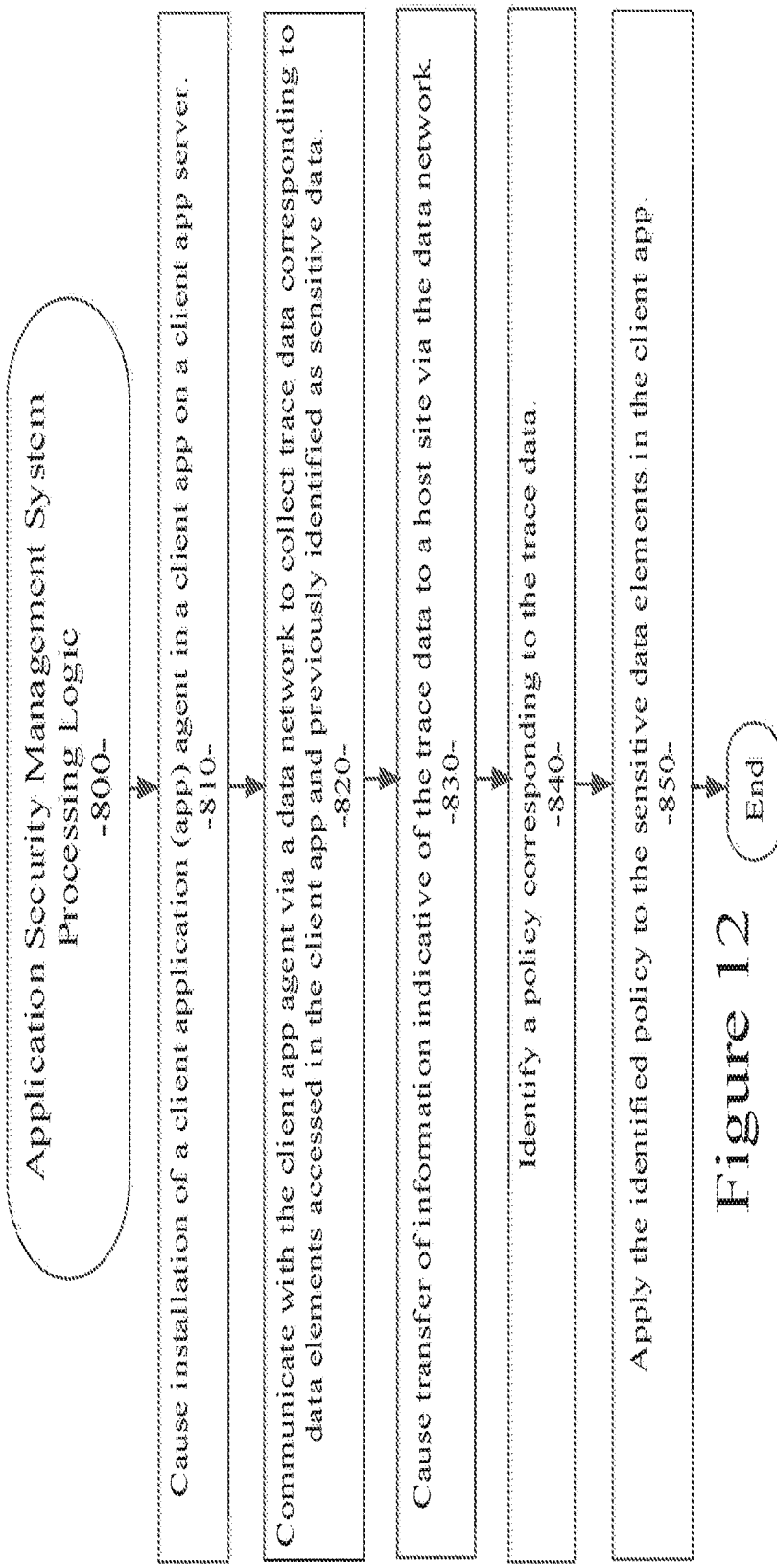
FIG. 12 is a processing flow chart illustrating an example embodiment of a method and system as described herein.

Referring now to FIG. 12, a processing flow diagram illustrates an example embodiment of an application security management system 200 as described herein. The system 800 of an example embodiment includes an application security management system configured to: cause installation of a client application (app) agent in a client app on a client app server (processing block 810); communicate with the client app agent via a data network to collect trace data corresponding to data elements accessed in the client app and previously identified as sensitive data (processing block 820); cause transfer of information indicative of the trace data to a host site via the data network (processing block 830); identify a policy corresponding to the trace data (processing block 840); and apply the identified policy to the sensitive data elements in the client app (processing block 850).

Figure 13:
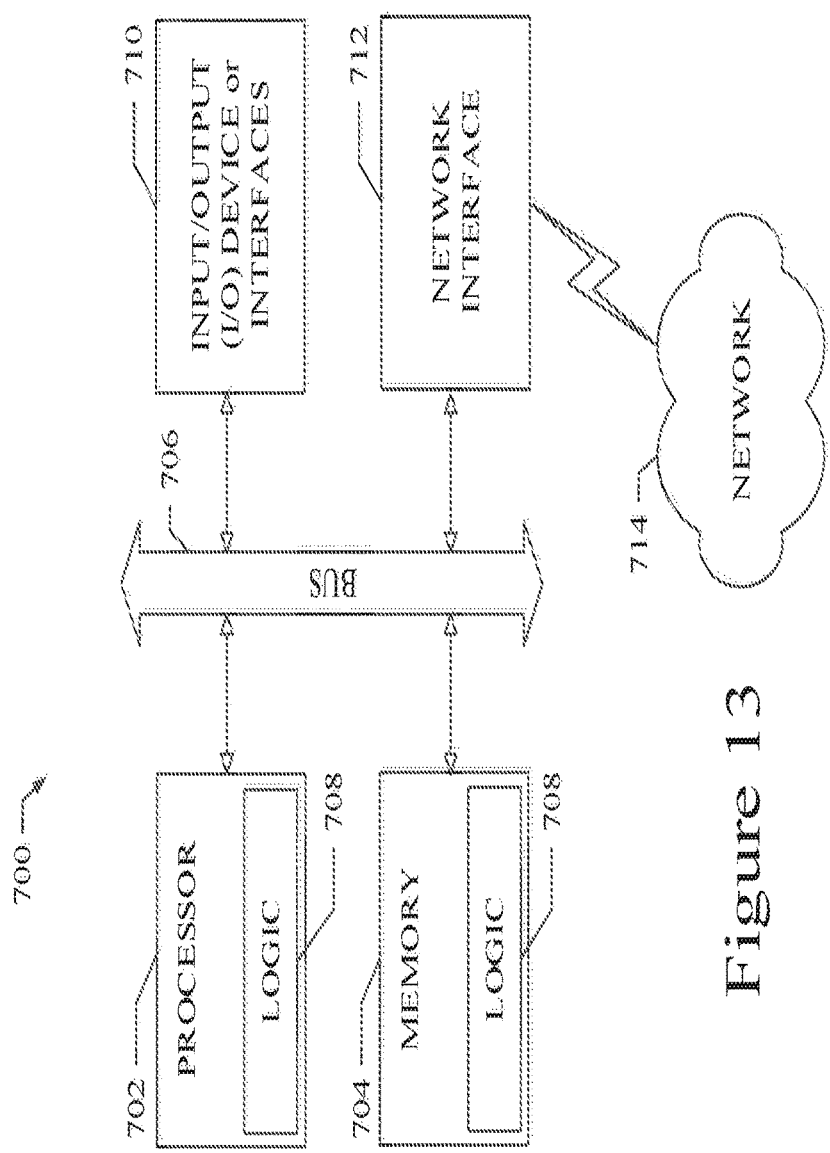
FIG. 13 shows a diagrammatic representation of machine in the example form of a computer system within which a set of instructions when executed may cause the machine to perform any one or more of the methodologies discussed herein.

FIG. 13 shows a diagrammatic representation of a machine in the example form of a stationary or mobile computing and/or communication system 700 within which a set of instructions when executed and/or processing logic when activated may cause the machine to perform any one or more of the methodologies described and/or claimed herein. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example stationary or mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The stationary or mobile computing and/or communication system 700 may further include various input/output (I/O) devices and/or interfaces 710, such as a monitor, touchscreen display, keyboard or keypad, cursor control device, voice interface, and optionally a network interface 712. In an example embodiment, the network interface 712 can include one or more network interface devices or radio transceivers configured for compatibility with any one or more standard wired network data communication protocols, wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™ IEEE™ 802.11x, and the like. In essence, network interface 712 may include or support virtually any wired and/or wireless communication mechanisms by which information may travel between the stationary or mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the stationary or mobile computing and/or communication system 700. As such, the memory 704 and the processor 702 may also constitute machine-readable media. The logic 708, or a portion thereof, may also be configured as processing logic or logic, at least a portion of which may be partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   a data processor;
   a network interface, in data communication with the data processor, for communication on a data network; and
   an application security management system, executable by the data processor, to: instrument one or more data input and output points of an application for one or more instances of data designated as sensitive data,
   access one or more policies corresponding to the one or more instances of the sensitive data,
   trace the one or more instances of the sensitive data through the application in association with the one or more policies each defined by a set of log rules, and
   generate an audit of each instance of the sensitive data and each instance of the set of log rules used by the each instance of the sensitive data,
   wherein the audit indicates a route leading to a log from which the sensitive data is accessed,
   wherein in addition to being defined by the set of log rules, the one or more policies comprise at least a count policy, an alert policy, a redaction policy, and an encryption policy each defined by a set of user output rules,
   wherein for each read, modification, or access of each instance of the sensitive data in the log based on the set of log rules, the count policy generates a counter for the each instance, the alert policy generates an alert for the each instance, the redaction policy obscures the each instance from being used, and the encryption policy encrypts the each instance to render the each instance unusable.

2. The system of claim 1, further comprising:
installing a plurality of input/output (I/O) instrumentation components that correspond to one or more I/O operations at the one or more data input and output points.

3. The system of claim 1, further comprising:
collecting trace data that corresponds to one or more data elements accessed by the application and previously designated as the sensitive data.

4. The system of claim 3, further comprising:
identifying the one or more policies corresponding to the one or more instances of the sensitive data by causing transfer of information indicative of the trace data to a host site.

5. A computer-implemented method comprising:
instrumenting one or more data input and output points of an application for one or more instances of data designated as sensitive data;
accessing one or more policies corresponding to the one or more instances of the sensitive data;
tracing the one or more instances of the sensitive data through the application in association with the one or more policies each defined by a set of log rules; and
generating an audit of each instance of the sensitive data and each instance of the set of log rules used by the each instance of the sensitive data,
wherein the audit indicates a route leading to a log from which the sensitive data is accessed;
wherein in addition to being defined by the set of log rules, the one or more policies comprise at least a count policy, an alert policy, a redaction policy, and an encryption policy each defined by a set of user output rules,
wherein for each read, modification, or access of each instance of the sensitive data in the log based on the set of log rules, the count policy generates a counter for the each instance, the alert policy generates an alert for the each instance, the redaction policy obscures the each instance from being used, and the encryption policy encrypts the each instance to render the each instance unusable.

6. The computer-implemented method of claim 5, further comprising:
installing a plurality of input/output (I/O) instrumentation components that correspond to one or more I/O operations at the one or more data input and output points.

7. The computer-implemented method of claim 5, further comprising:
collecting trace data that corresponds to one or more data elements accessed by the application and previously designated as the sensitive data.

8. The computer-implemented method of claim 7, further comprising:
identifying the one or more policies corresponding to the one or more instances of the sensitive data by causing transfer of information indicative of the trace data to a host site.

9. A non-transitory machine-useable storage medium embodying instructions which, when executed by a machine, cause the machine to:
instrument one or more data input and output points of an application for one or more instances of data designated as sensitive data;
access one or more policies corresponding to the one or more instances of the sensitive data;
trace the one or more instances of the sensitive data through the application in association with the one or more policies each defined by a set of log rules; and
generate an audit of each instance of the sensitive data and each instance of the set of log rules used by the each instance of the sensitive data,
wherein the audit indicates a route leading to a log from which the sensitive data is accessed,
wherein in addition to being defined by the set of log rules, the one or more policies comprise at least a count policy, an alert policy, a redaction policy, and an encryption policy each defined by a set of user output rules,
wherein for each read, modification, or access of each instance of the sensitive data in the log based on the set of log rules, the count policy generates a counter for the each instance, the alert policy generates an alert for the each instance, the redaction policy obscures the each instance from being used, and the encryption policy encrypts the each instance to render the each instance unusable.

10. The non-transitory machine-useable storage medium of claim 9, further comprising:
installing a plurality of input/output (I/O) instrumentation components that correspond to one or more I/O operations at the one or more data input and output points.

11. The non-transitory machine-useable storage medium of claim 9, further comprising:
collecting trace data that corresponds to one or more data elements accessed by the application and previously designated as the sensitive data.

12. The non-transitory machine-useable storage medium of claim 11, further comprising:
identifying the one or more policies corresponding to the one or more instances of the sensitive data by causing transfer of information indicative of the trace data to a host site.

* * * * *